(12) United States Patent
Lee et al.

(10) Patent No.: US 12,250,624 B2
(45) Date of Patent: Mar. 11, 2025

(54) METHOD AND DEVICE FOR SUPPORTING INTERWORKING BETWEEN SYSTEMS IN WIRELESS COMMUNICATION SYSTEM

(71) Applicant: Samsung Electronics Co., Ltd., Gyeonggi-do (KR)

(72) Inventors: Hoyeon Lee, Gyeonggi-do (KR); Jungshin Park, Gyeonggi-do (KR); Youngkyo Baek, Gyeonggi-do (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 494 days.

(21) Appl. No.: 17/565,748

(22) Filed: Dec. 30, 2021

(65) Prior Publication Data

US 2022/0210725 A1 Jun. 30, 2022

(30) Foreign Application Priority Data

Dec. 31, 2020 (KR) .......................... 10-2020-0188991

(51) Int. Cl.
*H04W 48/18* (2009.01)
*H04W 8/22* (2009.01)

(52) U.S. Cl.
CPC ............. *H04W 48/18* (2013.01); *H04W 8/22* (2013.01)

(58) Field of Classification Search
CPC ......... H04W 48/18; H04W 8/22; H04W 8/00; H04W 36/14; H04W 36/0033; H04W 36/385
See application file for complete search history.

(56) References Cited

U.S. PATENT DOCUMENTS

| | | | |
|---|---|---|---|
| 10,687,275 B2 * | 6/2020 | Lee | ........................ H04W 48/18 |
| 2019/0053104 A1 * | 2/2019 | Qiao | ..................... H04W 28/24 |
| 2019/0124561 A1 | 4/2019 | Faccin et al. | |
| 2019/0150081 A1 | 5/2019 | Qiao et al. | |
| 2020/0092758 A1 | 3/2020 | Youn et al. | |
| 2020/0187043 A1 | 6/2020 | Xin et al. | |
| 2021/0136602 A1 * | 5/2021 | Pokkunuri | .............. H04W 8/02 |

(Continued)

FOREIGN PATENT DOCUMENTS

| | | |
|---|---|---|
| EP | 3 826 367 | 5/2021 |
| KR | 10-2021-0058479 | 11/2019 |
| WO | WO 2021/096222 | 5/2021 |

OTHER PUBLICATIONS

CT4, "LS on Service Operation used during EPS to 5GS Handover with AMF RE-allocation", C4-205702, 3GPP TSG-CT WG4 Meeting #101e, Nov. 3-13, 2020, 2 pages.

(Continued)

*Primary Examiner* — Chi H Pham
*Assistant Examiner* — Raul Rivas
(74) *Attorney, Agent, or Firm* — The Farrell Law Firm, P.C.

(57) ABSTRACT

Disclosed is a method performed by a first entity in a wireless communication system, including transmitting, to a second entity, a first request message including information related to inter-system interworking, receiving, from the second entity, a first response message including information related to at least one other first entity in response to the first request message, and selecting one from among the at least one other first entity based on the first response message.

18 Claims, 8 Drawing Sheets

(56) References Cited

U.S. PATENT DOCUMENTS

2021/0153268 A1   5/2021  Lee et al.

OTHER PUBLICATIONS

International Search Report dated Apr. 7, 2022 issued in counterpart application No. PCT/KR2021/020294, 8 pages.
3GPP TS 23.501 V16.7.0, 3rd Generation Partnership Project; Technical Specification Group Services and System Aspects; System Architecture for the 5G System (5GS); Stage 2 (Release 16), Dec. 2020, 450 pages.
3GPP TS 23.502 V16.7.0, 3rd Generation Partnership Project; Technical Specification Group Services and System Aspects; Procedures for the 5G System (5GS); Stage 2 (Release 16), Dec. 2020, 603 pages.
3GPP TS 29.531 V16.5.0, 3rd Generation Partnership Project; Technical Specification Group Core Network and Terminals; 5G System; Network Slice Selection Services; Stage 3 (Release 16), Dec. 2020, 77 pages.
3GPP TS 29.510 V17.0.0, 3rd Generation Partnership Project; Technical Specification Group Core Network and Terminals; 5G System; Network Function Repository Services; Stage 3 (Release 17), Dec. 2020, 229 pages.
European Search Report dated Apr. 25, 2024 issued in counterpart application No. 21915878.9-1215, 14 pages.

\* cited by examiner

METHOD AND DEVICE FOR SUPPORTING INTERWORKING BETWEEN SYSTEMS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2020-0188991, filed on Dec. 31, 2020, in the Korean Intellectual Property Office, the disclosure of which is incorporated herein by reference in its entirety.

BACKGROUND

1. Field

The disclosure relates generally to wireless communication, and more particularly, to a method and device for supporting system interworking in a wireless communication system.

2. Description of Related Art

In order to meet the demand for wireless data traffic soaring since the fourth generation (4G) communication system came to the market, there are ongoing efforts to develop enhanced 5G communication systems or pre-fifth generation (5G) communication systems. For these reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MEM), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of things (IoT) network by which information is communicated and processed between things or other distributed components. Another arising technology is the Internet of everything (IoE), which is a combination of the big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC). In the IoT environment may be offered intelligent internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology techniques and various industries.

Thus, efforts have been made to apply the 5G communication system to the IoT network. For example, the sensor network, M2M, MTC, or other 5G communication techniques are implemented by beamforming, MIMO, and array antenna schemes. The above-referenced application of the cloud RAN as a big data processing technique is an example of the convergence of the 5G and IoT technologies.

With the recent development of communication systems, various studies are being conducted to provide different network slicing (or network slices) in a 5G-based wireless communication system.

However, there is a need in the art to effectively provide a service in a mobile communication system by providing an interworking method between a 5G network system architecture providing a network slice function and a 4G network system.

SUMMARY

The disclosure has been made to address at least the above-mentioned problems and/or disadvantages and to provide at least the advantages described below.

Accordingly, an aspect of the disclosure is to provide a method and device for supporting system interworking in a wireless communication system.

Another aspect of the disclosure is to provide a method and device for supporting evolved packet core (EPC) interworking in a wireless communication system.

Another aspect of the disclosure is to provide a method and device for supporting system interworking between a system supporting a network slice function and a system not supporting a network slice function in a wireless communication system.

Another aspect of the disclosure is to provide a method and device for system interworking between a 5G system providing a network slice function and a 4G system in a wireless communication system.

In accordance with an aspect of the disclosure, a method performed by a first entity in a wireless communication system includes transmitting, to a second entity, a first request message including information related to inter-system interworking, receiving, from the second entity, a first response message including information related to at least one other first entity in response to the first request message, and selecting one from among the at least one other first entity based on the first response message.

In accordance with another aspect of the disclosure, a first entity in a wireless communication system includes a transceiver, and a controller configured to control the transceiver to transmit, to a second entity, a first request message including information related to inter-system interworking and receive, from the second entity, a first response message including information related to at least one other first entity in response to the first request message and to select one from among the at least one other first entity based on the first response message.

In accordance with another aspect of the disclosure, a method performed by a first entity in a wireless communication system includes receiving, from a second entity, a first request message including information related to a third entity, transmitting, to the third entity, a session context request message based on the first request message, receiving, from the third entity, a session context response message including information related to a public data network (PDN) connection, and selecting one from among the at least one other first entity based on the session context response message.

In accordance with another aspect of the disclosure, a first entity in a wireless communication system includes a transceiver, and a controller configured to control the transceiver to receive, from a second entity, first request message including information related to third entity, control the transceiver to transmit, to the third entity, a session context request message based on the first request message, control the transceiver to receive, from the third entity, a session context response message including information related to public data network connection and select one from among the at least one other first entity based on the session context response message.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
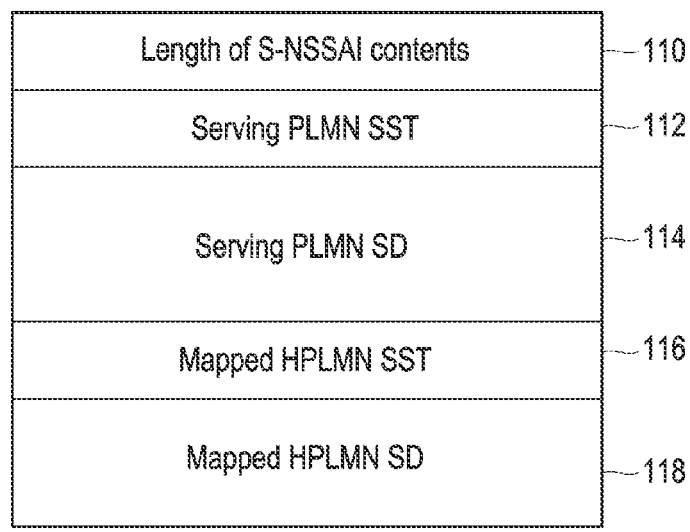
FIG. 1 illustrates a configuration of an information element related to a network slice to which the disclosure is applied; to FIG. 2 illustrates a structure of a wireless communication system supporting interworking between networks for use of a network slice to which the disclosure is applied.

Hereinafter, embodiments are described in detail with reference to the accompanying drawings. The same reference denotations may be used to refer to the same or similar elements throughout the specification and the drawings. In the following description and drawings, a detailed description of known functions or configurations that may make the subject matter of the disclosure unnecessarily unclear will be omitted.

Some elements may be exaggerated or schematically shown. The size of each element does not necessarily reflect the actual size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure.

As used herein, the term unit indicates a software element or a hardware element that plays a role, such as a field-programmable gate array (FPGA) or an application specific integrated circuit (ASIC). However, the term unit is not limited to a software or hardware element. A unit may be configured in a storage medium that may be addressed or may be configured to reproduce one or more processors. Accordingly, as an example, a unit includes elements, such as software elements, object-oriented software elements, class elements, task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. An element or a 'unit' may be implemented to reproduce one or more central processing units (CPUs) in a device or a security multimedia card.

The base station may be an entity allocating resource to terminal and may be at least one of gNode B, gNB, eNode B, eNB, Node B, base station (BS), wireless access unit, base station controller, or node over network. The base station may include at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

The UE may include a mobile station (MS), a cellular phone, a smart phone, a computer, or various devices capable of performing a communication function. In the disclosure, downlink (DL) refers to a wireless transmission path of signals transmitted from the base station to the UE, and uplink (UL) refers to a wireless transmission path of signals transmitted from the UE to the base station. Although the LTE or LTE-A systems may be described below as an example, embodiments may be applied to other communication systems having a similar technical background or channel shape. For example, 5G mobile communication technology (5G, new radio, NR) developed after LTE-A may be included therein, and 5G may include legacy LTE, LTE-A and other similar services. The embodiments may be modified in such a range as not to significantly depart from the scope of the disclosure under the determination by one of ordinary skill in the art and such modifications may be applicable to other communication systems.

Disclosed herein is a device and method for providing interworking between network slices (or network slicing) in a wireless communication system. Specifically, the disclosure describes a technology for supporting interworking between a 5G network system providing a network slice function and an evolved packet system (EPS) network system in a wireless communication system.

As used herein, terms denoting signals, channels, control information, network entities, and device components are provided as an example for ease of description. As used herein, terms for identifying nodes and for denoting messages, inter-network entity interfaces, and various pieces of identification information are provided as an example for ease of description. The disclosure is not limited to these terms, and other terms equivalent in technical concept may also be used.

Although the disclosure describes embodiments using terms from communication standards such as 3rd generation partnership project (3GPP), this is merely an example for description. Various embodiments may be modified and applied in other communication systems.

The 3GPP standard standardized the 5G network system architecture and procedures. A mobile communication carrier may provide various services in a 5G network. To do so, the mobile communication carrier needs to meet different service requirements (e.g., latency, communication range, data rate, bandwidth, reliability, etc.) for each service.

The mobile communication carrier may constitute the network slice and may allocate network resources suitable for a specific service for each network slice or set of network slices.

In a wireless communication system supporting network slicing, traffic for different network slices may be processed by different protocol data unit (PDU) sessions. The PDU session indicates an association between a data network providing a PDU connection service and a UE. Network slicing logically configures a network with a set of NFs to support various services with different characteristics, such as broadband communication services, massive IoT, vehicle-to-everything (V2X), or other mission critical services, and separating different network slices. Therefore, even when a communication failure occurs in one network slice, communication in other network slices is not affected, so that it is possible to provide a stable communication service. In the disclosure, the term slice may be used interchangeably with network slice. In such a network environment, the UE may access a plurality of network slices when receiving various services. The NF may be a software instance running on hardware and may be implemented as a virtualized function instantiated on an NF or an appropriate platform.

Herein, a network resource indicates an NF or logical resource provided by the NF or radio resource allocation of a base station. For example, a mobile communication carrier may configure network slice A for providing a mobile broadband service, network slice B for providing a vehicle communication service, and network slice C for providing an IoT service. In other words, the 5G network may efficiently provide a corresponding service to a UE through a specialized network slice suited for the characteristics of each service.

FIG. 1 illustrates a configuration of a network slice IE in a wireless communication system to which the disclosure is applied.

Referring to FIG. 1, single-network slice selection assistance information (S-NSSAI) defined by 3GPP may be used as a differentiator identification information) for identifying the network slice. The network slice IE shown in FIG. 1 represents an example of an S-NSSAI IE configuration. One S-NSSAI may include at least one of a slice/service type (SST) 116 used in the home public land mobile network (HPLMN), a slice differentiator (SD) 118 used in the HPLMN, an SST 112 used in the serving PLMN, and an SD 114 used in the serving PLMN. The S-NSSAI IE may further include a field 110 indicating the length of content included in the S-NSSAI IE.

In a non-roaming situation, the SST 112 used in the serving PLNM may be identical to the SST 116 used in the HPLMN, and the SD 114 used in the serving PLNM may be identical to the SD 118 used in the HPLMN.

In a roaming situation, the SST 112 used in the serving PLMN may be identical to the SST used in the visited PLMN (VPLMN), and the SD 114 used in the serving PLMN may be identical to the SD used in the VPLMN.

Each SST and each SD constituting one S-NSSAI may or may not have a value depending on the situation.

Network slice selection assistance information (NSSAI) may be constituted of one or more S-NSSAIs. Examples of the NSSAI may include, but are not limited to, a configured NSSAI stored in the UE, a requested NSSAI requested by the UE, an allowed NSSAI determined by the NF (e.g., access and mobility function (AMF), session management function (SW), user plane function (UPF), policy control function (PCF), user data management (UDM), user data repository (UDR), network slice selection function (NSSF), or network repository function (NRF)) of the 5G core network and allowed to be used by the UE, and the subscribed NSSAI where the UE subscribes.

The mobile communication carrier may operate a 5G network and an EPS network together. Hereinafter, for convenience of description, the EPS network may also be referred to as an LTE-based network or a 4G network. The mobile communication UE may access the 5G network, use the service, and then move to the EPS network. Alternatively, the UE may access the EPS network, use the service, and then move to the 5G network. Interworking between networks (between systems) related to the movement of the UE may be referred to as 5G core (5GC)-EPC interworking or 5G system (5GS)-EPS interworking.

Disclosed herein is a scheme for interworking (e.g., 5G-S-EPS interworking or 5GC-EPC interworking) between a 5G network system, which provides a network slice function, and an EPS network system in a wireless communication system.

Further disclosed herein are network operations and UE operations that allow a UE, which establishes a session connection in 5GS in a wireless communication system and uses a communication service, to perpetually use the service while moving to the EPS or allows a UE, which establishes a session connection in EPS and uses a communication service, to perpetually use the service while moving to the 5GS.

Figure 2:
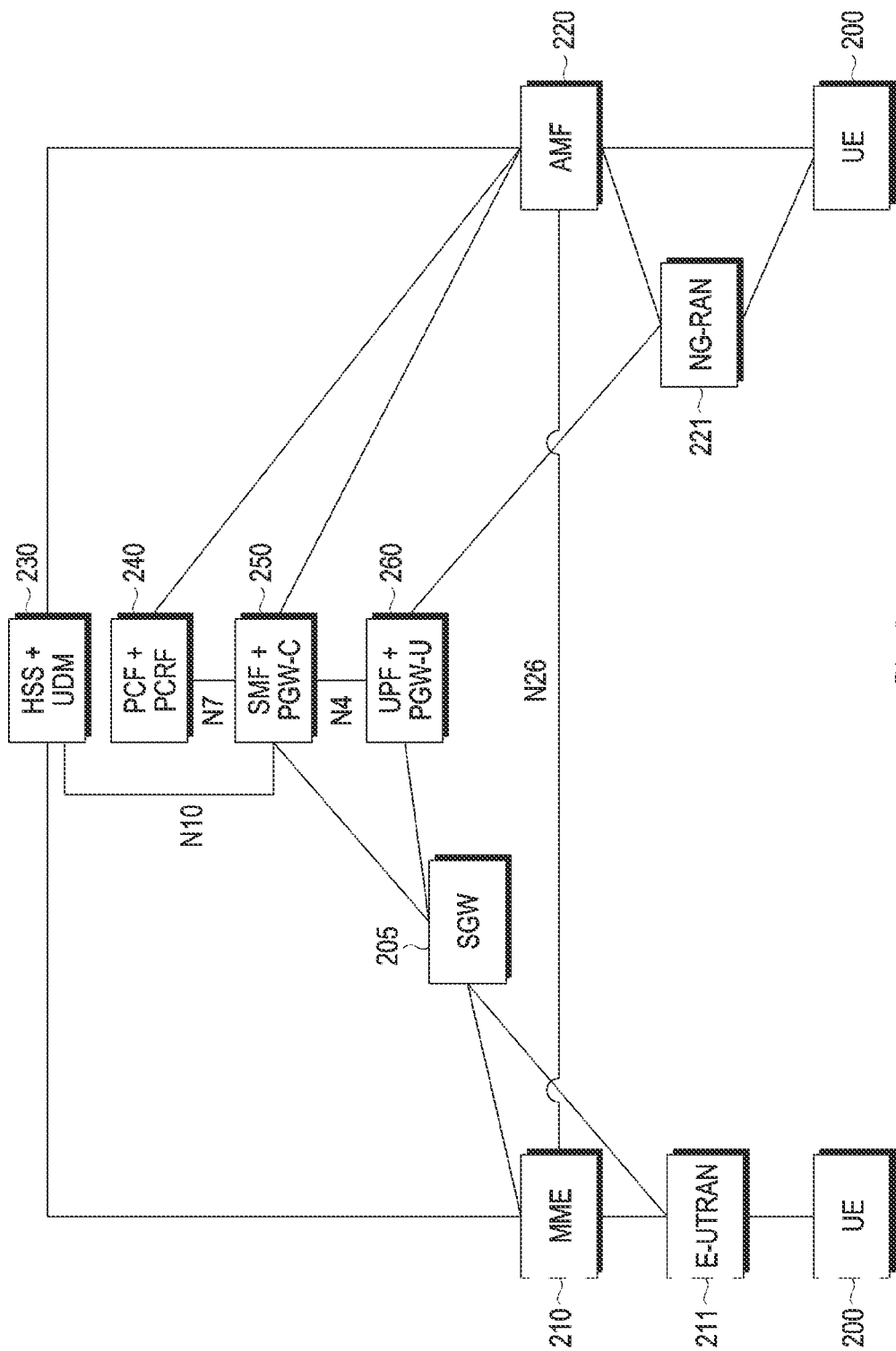

FIG. 2 illustrates a structure of network slice interworking in a wireless communication system to which the disclosure is applied.

In the disclosure, the network technology may refer to the standards defined by the international telecommunication union (ITU) or 3GPP, and each of the components included in the network architecture of FIG. 2 indicates a physical entity or software that performs an individual function or hardware combined with software. Reference characters denoted by Nx in FIG. 2, such as N1, N2, N3, . . . , etc., indicate known interfaces between NFs in the 5G core network (CN), and the relevant descriptions may be found in the standard specifications. Therefore, a detailed description will be omitted. In the following description with reference to FIG. 2, an illustration/description of NFs not directly related to the disclosure will be omitted.

FIG. 2 illustrates an example of an interworking structure of 5GS and in a non-roaming situation, 5GS may include a new radio (NR) base station (e.g., next-generation-radio access node (NG-RAN) or next-generation node B (gNB)) 221, an AMF 220, an SMF, a UPF, a PCF, an NSSF, a UDM, a UDR, and an NRF. EPS may include, e.g., an E-UTRA base station (e.g., evolved universal mobile telecommunications system (UMTS) terrestrial radio access network (E-UTRAN) or evolved node B (eNB)) 211, a mobility management entity (MME) 210, a serving gateway (SGW) 205, a packet data network gateway (PGW) including PGW-U and PGW-C, a policy and charging rule function (PCRF) 240, and a home subscriber server (HSS) 230.

The AMF 220 and the MME 210 are Fs for managing wireless network access and mobility for the UE. The SWF, SGW, and PGW are NFs that manage a session for the UE. The session information may include quality of service (QoS) information, charging information, and packet processing information. The UPF and PGW are NFs that process user plane traffic and are controlled by the SMF and SGW. The PCF and PCRF 240 are NFs that manage operator policy and/or PLMN policy for providing a service in a wireless communication system. The PCF may be divided into a PCF in charge of an access and mobility (AM) policy and UE policy and a PCF in charge of session management (SM) policy. The PCF in charge of AM/UE policy and the PCF in charge of SM policy may be logically or physically separated NFs or one NF. The UDM and HSS 230 are NFs for storing and managing subscriber information (UE subscription) of the UE. The UDR is an NF or a database (DB) that stores and manages data. The UDR may store subscription information for the UE and may provide the UDM with the subscription information for the UE. The UDR may store operator policy information and may provide operator policy information to the PCF. The NSSF may be an NF that selects the network slice instance serving the UE or determines the NSSAI.

A specific NF may exist in the form of a software code and may be executable by being assigned a physical or/and logical resource from a physical computing system present on a core network to perform the function of the NF. For example, the AMF, SW, and NSSF instances may indicate when a physical and/or logical resource is assigned from a specific computing system present on a core network to perform the AMF, SMF, and NSSF operation, respectively. Thus, the AMF, SW, and NSSF instances which receive and use a physical and/or logical resource from a specific computing system present on a network may perform the same operations as when a physical AMF, SW, and NSSF device exists.

The UDM of 5GS and HSS of EPS may be configured as one combo node (UDM+HSS) 230. The UDM-HSS 230 node may store subscriber information for the UE. The PCF of 5GS and PCRF of EPS may be configured as one combo node (PCF+PCRF) 240. The SMF of 5GS and PGW-C of EPS may be configured as one combo node (SMF+PGW-C) 250. The UPF of 5GS and PGW-U of EPS may be configured as one combo node (UPH+PGW-U) 260. The UE 200 may access the MME of the EPS through the E-UTRA base station 211 and use the EPS network service. The UE 200 may access the AMF 220 of 5GS through the NR base station 221 to use the 5GS network service.

In this manner, one NF or network entity may simultaneously support different network systems, and such NF, network node, or network entity may be referred to as the previously described combo node, combo NF, combined node, combined NF, interworking node, or interworking NF. The function of the NF exemplified as the combo node may be implemented through interworking between two or more network entities. NFs simultaneously supporting different network systems may be indicated using the symbol "+" or "/" for convenience of illustration and description. For example, when SMF and PGW-C 250 are configured as one combo node, they may be expressed as PGW-C/SMF, PGW-C+SMF, SMF/PGW-C, or SMF+PGW-C 250.

The AMF may provide several functions. Each AMF may provide a different function. As an example, there may be an AMF supporting or not supporting the EPC interworking function. When the AMF supports the EPC interworking function, this indicates that the AMF may connect with the MME through the N26 interface. In the MME 210 and the AMF 220 connection illustrated in FIG. 2, the AMF, if supporting the EPC interworking function also indicates that the AMF may interpret a message, such as an EPC NAS message or EPC NAS parameter generated by a 4G network entity (e.g., MME) or the 4G network entity may generate a message, which may be interpreted. An indication of whether the AMF may support the EPC interworking function may be stored in the AMF, as AMF configuration information. In this case, the AMF configuration information may be configured in the AMF through operation and maintenance (OAM or O&M).

The AMF may enable connection with a specific MME, such as communication through the N26 interface, as illustrated in FIG. 2 by the connection between the MME 210 and the AMF 220. For example, the AMF may be able to connect with a specific MME referred to as an MME identifier. The MME identifier may include at least one of MME id, MME group id, MME pool id, or PLMN id. In this case, the AMF may not be able to connect with an MME other than the MME indicated by the MME identifier. The AMF-connectable MME identifier information, as AMF configuration information, may be stored in the AMF. In this case, the AMF configuration information may be configured in the AMF through OAM (O&M).

The AMF may be capable of a specific N26 connection (hereinafter, an N26 domain). The N26 domain may be identified by the N26 domain identifier. The AMF may be capable of a specific N26 connection, indicated by the N26 domain identifier. The AMF may be incapable of N26 connection other than the N26 connection indicated by the N26 domain identifier. The AMF-connectable N26 domain information, as AMF configuration information, may be stored in the AMF. In this case, the AMF configuration information may be configured in the AMF through OAM (O&M).

The NR base station selects the AMF according to a temporary identifier or identity (ID). When the temporary ID is not available, an AMF is selected using the NSSAI received from the UE, from the radio resource control (RRC) connection configuration message to select an appropriate AMF. If the NSSAI is not available either, the NR base station selects the previously configured initial AMF and connects to the UE, as described in TS 38.300 v 16.0.0.

Figure 3:
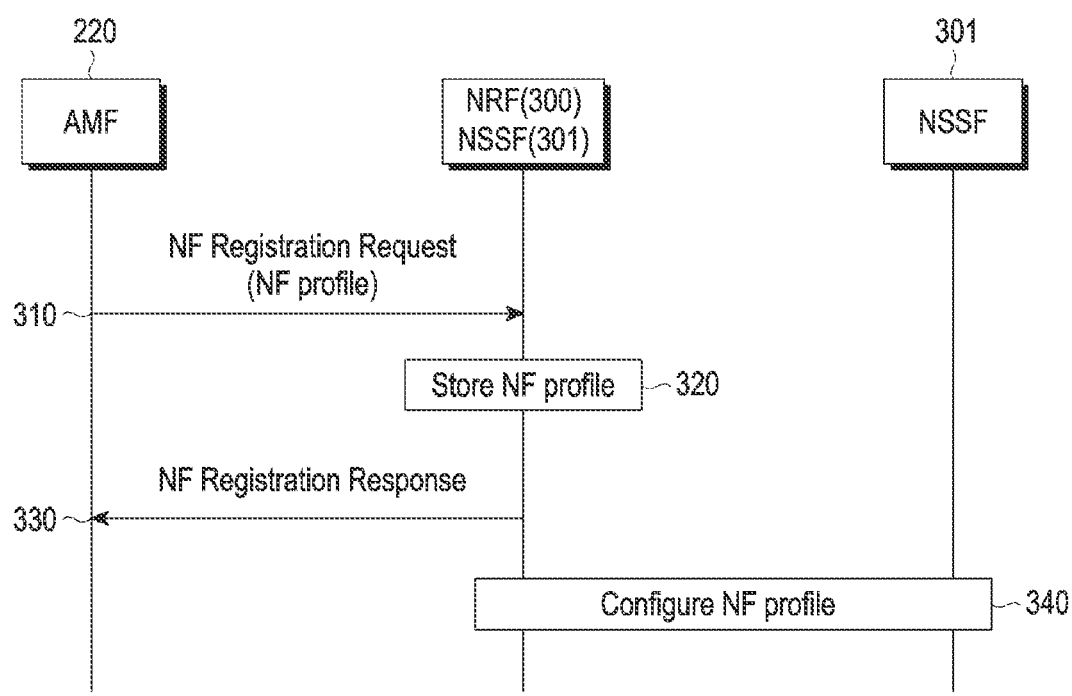
FIG. 3 illustrates a network function (NF) registration method according to an embodiment.

FIG. 3 illustrates a process for registering a network entity in a wireless communication system according to an embodiment. First, the functions supported by the NFs constituting the communication system (e.g., the NFs constituting the wireless communication system of FIG. 2) may be efficiently stored and managed through the process of FIG. 3.

Referring to FIG. 3, in step 310, the AMF 220 may transmit an NF registration request message to the NRF 300 (or the NSSF 301). The NRF 300 (or NSSF 301) may be a network entity that manages the NF's (e.g., the AMF). The NF registration request message may include information regarding the function supported by the AMF 220 (hereinafter referred to as an NF profile). For example, the AMF 220 supporting the EPC interworking function according to various embodiments may include an EPC interworking function indicator, e.g., an indicator indicating that EPC interworking is supported, in the NF registration request message. The EPC interworking function indicator may also be implemented in the form of an indicator indicating whether EPC interworking is supported. The AMF 220 supporting connection with a specific MME may include identifier information (e.g., at least one of MME id, MME group id, MME pool id, or PLMN id) indicating the specific MME, in the NF registration request message. The AMF 220 supporting a specific N26 connection may include identifier information (e.g., an N26 domain indicator) indicating the specific N26, in the NF registration request message.

Upon receiving the NF registration request message from the AMF 220, the NRF 300 (or NSSF 301) may store the profile information included in the NF registration request message received from the AMF 220, in step 320. The NRF 300 (or the NSSF 301) may perform an NF discovery and selection procedure to be described below in connection with FIG. 4, based on the stored NF profile information in step 320.

The NRF 300 (or NSSF 301) that has thusly processed the NF registration request message may transmit an NF registration response message, which is responsive to the NF registration request message, to the AMF 220 in step 330.

If the network entity that processes the NF registration request message in steps 310 to 330 is the NRF 300, the NRF 300 may additionally perform step 340 by configuring the NF profile information for the AMF 220 stored in step 320, to the NSSF 301. In this case, the NRF 300 may transmit the NF profile information for the AMF 220 directly to the NSSF 301 or may configure the NF profile information to the NSSF 301 through OAM (O&M). The NSSF 301 may store the NF profile information for the AMF 220 received from the NRF 300 or configured through OAM (O&M).

In FIG. 3, as the AMF 220 includes the EPC interworking-related information, e.g., EPC interworking function indicator, in information for its supporting function, e.g., NF profile, other NFs, e.g., the NRF or NSSF, may efficiently store and manage information for the AMF.

Figure 4:
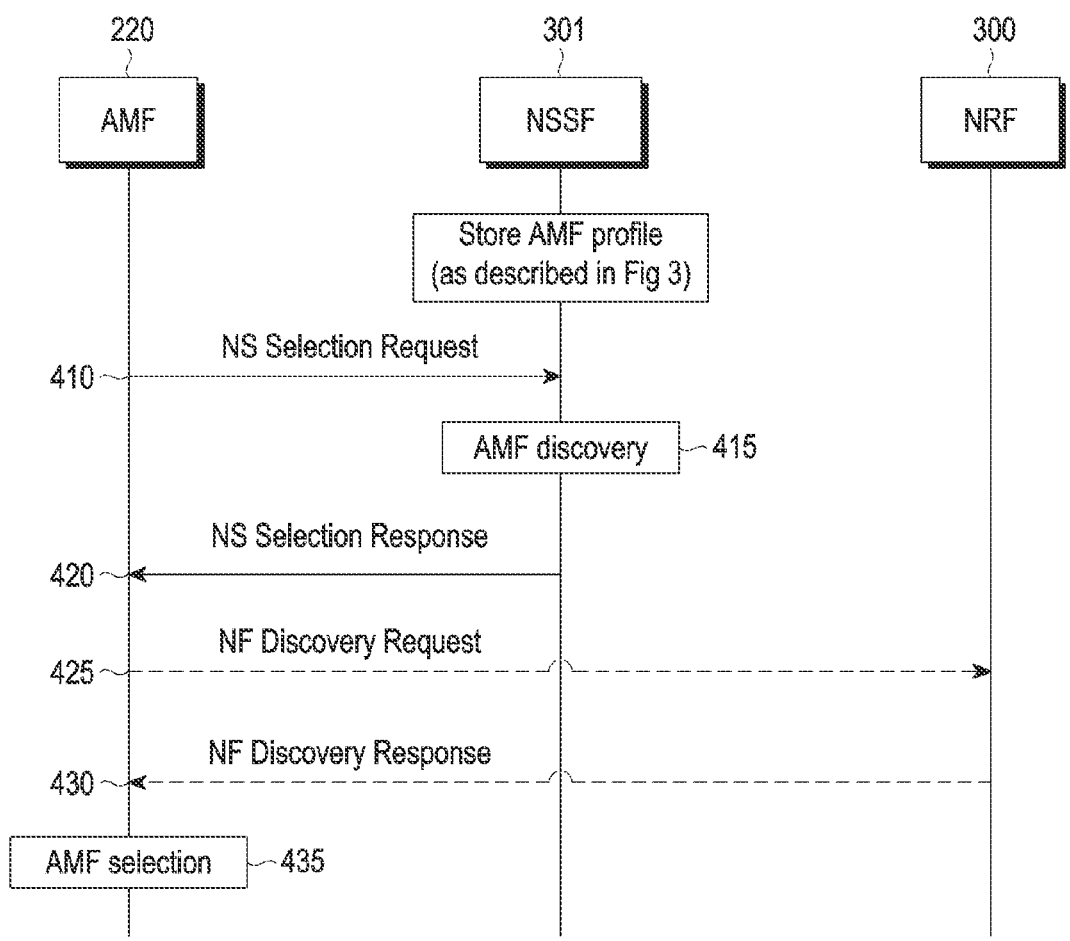
FIG. 4 illustrates an NF discovery and selection method according to an embodiment.

FIG. 4 illustrates a network entity discovery and selection process in a wireless communication system according to an embodiment.

The wireless communication system may efficiently discover and select an NF providing a specific function through the process shown in FIG. 4.

Referring to FIG. 4, first, the NSSF 301 may store the NR profile of a first AMF 400 e.g., the AWF 220, through the process as described above in connection with FIG. 3.

In step 410, the first AMF 400 may transmit an NS selection request message to the NSSF 301 to discover another AMF, e.g., a second AMF. The NS selection request message may include the NR profile of the second. AMF to be discovered by the first AMF 400. For example, the NS selection request message may include at least one of S-NSSAI, EPC interworking function indicator, MME identifier, and N26 domain information. For example, the first AMF 400 to discover the second AMF supporting the EPC interworking function may include the EPC interworking function indicator in the NS selection request message of step 410. Here, the EPC interworking function indicator may be implemented in the form of an indicator indicating that EPC interworking is supported or in the form of an indicator indicating whether EPC interworking is supported.

In step 415, the NSSF 301 receiving the NS selection request message from the first AMF 400 may discover the second AMF required by the first AMF 400 based on NR profile information for the AMFs stored through the process as described above in connection with FIG. 3. For example, when the S-NSSAI A and EPC interworking function indicator are included in the NS selection request message, the NSSF 301 may discover an AMF that may support the EPC interworking function while supporting S-NSSAI A, in step 415.

In step 420, the NSSF 301 may transmit an NS selection response message, which is responsive to the NS selection request message, to the first AMF 400. The NS selection response message may include AMF information (e.g., AMF set or AMF address list, etc.) for the second AMF discovered in step 415 by the NSSF 301.

Upon receiving the NS selection response message from the NSSF 301, the first AMF 400 may select the second AMF based on information for the second AMF included in the NS selection response message in step 435. For example, when there is one piece of information for the second AMF included in the NS selection response message, the first AMF 400 may select the AMF included in the NS selection response message as the second AMF. Alternatively, when there is a plurality of pieces of information for the second AMF included in the NS selection response message, the first AMF 400 may select the AMF, which corresponds to one of the plurality of pieces second AMF information included in the NS selection response message, as the second AMF.

The NS selection request message in step 410 may include only a part of the NR profile of the second AMF to be discovered by the first AMF 400. For example, the first AMF 400 to discover the second AMF supporting the EPC interworking function may not include the EPC interworking function indicator in the NS selection request message of operation 410.

The NSSF 301 receiving the NS selection request message from the first AMF 400 may discover the second AMF required by the first AMF 400 based on NR profiles for the AMFs stored through the process as described above in connection with FIG. 3. For example, when S-NSSAI A is included in the NS selection request message, the NSSF 301 may discover an AMF supporting S-NSSAI A.

Returning to step 420, the NSSF 301 may transmit an NS selection response message to the first AMF 400. In this case, the NS selection response message may include information (e.g., AMF set or AMF address list, etc.) for the second AMF discovered in step 415 by the NSSF 301. The NS selection response message may include information regarding functions supported by the second AMF, e.g., the NR profile of the second AMF (e.g., EPC interworking function indicator, MME identifier, N26 domain information, etc.).

Upon receiving the NS selection response message from the NSSF 301, the first AMF 400 may select the second AMF based on the AMF information included in the NS selection response message in step 435. For example, the first AMF 400 may select the second AMF supporting the EPC interworking function while supporting S-NSSAI A among the AMFs included in the NS selection response message, based on the AMF information received from the NSSF 301.

The first AMF 400 may select the second AMF through the NRF 300 as illustrated in steps 425 to 430. In step 425, the first AMF 400 may include the NR profile of the second AMF to be discovered by the first AMF 400 in the NE discovery request message. The NF discovery request message may include AMF information received from the NSSF 301 in step 420. The NRF 300 receiving the NF discovery request message from the first AMF 400 may discover the second AMF required by the first AMF 400 based on the AMF profile information stored through the process as described above in connection with FIG. 3. In step 430, the NRF 300 may transmit a discovery response message, which is responsive to the NF discovery request message. The NF discovery response message may include AMF information (e.g., AMF set or AMF address list, etc.) for the second AMF discovered by the NRF 300. The NF discovery response message may include information regarding functions supported by the second AMF, e.g., the NR profile of the second AMF (e.g., EPC interworking function indicator, MME identifier, N26 domain information, etc.). Upon receiving the NF discovery response message from the NRF 300, the first AMF 400 may select the second AMF based on the AMF information included in the NF discovery response message in step 435.

Figure 5:
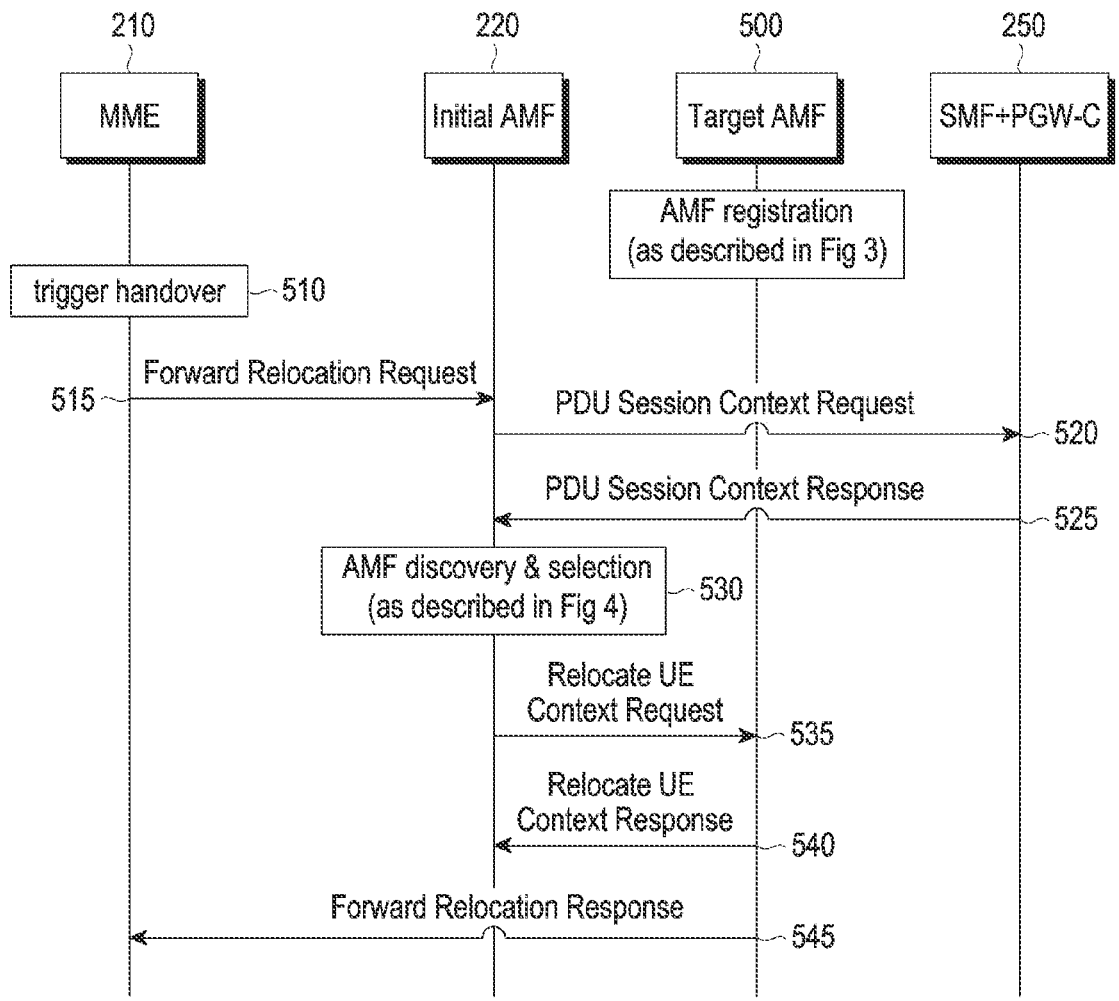
FIG. 5 illustrates a 4G/5G handover method according to an embodiment.

FIG. 5 illustrates an example of a 4G/5G handover process in a wireless communication system according to an embodiment.

In particular, a target AMF selection process is described in more detail in connection with FIG. 5.

Referring to FIGS. 2 and 5, the UE 200 may access the MME 210 of the EPS through the E-UTRA base station 211 (E-UTRAN or eNB) to establish a PDN connection and use the EPS network service. Information for the PDN connection established by the UE 200 may be stored in the SMF+PGW–C 230. The PDN connection information may include S-NSSAI.

In step 510 in FIG. 5, the MME 210 may detect the need for a handover for the UE 200 to move from 4G to 5G. For example, the MME 210 may initiate (trigger) a handover based on the handover request message received from the E-UTRA base station 211.

The MME 210 that has determined to start the 4G/5G handover may select the initial AMF 220 and, in step 515, may transmit a forward relocation request message to the initial AMF 220. In this case, the MME 210 may select the initial AMF 220 based on the MME 210 configuration information. The initial AMF 220 may be connected with the MME 210 through an N26 interface. The forward relocation request message may include information for the SMF+PGW–C 250 that manages the PDN connection established by the UE 200.

Upon receiving the forward relocation request message from the MME 210 in step 515, the initial AMF 220 may start a 4G/5G handover procedure of the UE 200.

In step 520, the initial AMF 220 may transmit a PDU session context request message to the SMF+PGW–C 250 included in the forward relocation request message.

In step 525, the SMF+PGW–C 250 may transmit a PDU session context response message, which is responsive to the PDU session context request message, to the initial AMF 220. The PM session context response message may include information regarding the PDN connection established by the UE 200 in the (e.g., S-NSSAI associated with the PDN connection).

The initial AMF 220 may determine whether the initial AMF 220 may support the S-NSSAI associated with the PDN connection established by the UE 200 in the EPC. If the initial AMF 220 may support S-NSSAI, the initial AMF 220 may determine to serve as the serving AMF of the UE 200. If the initial AMF 220 cannot support S-NSSAI, the initial AMF 220 may determine to perform step 530 for discovering a target AMF capable of supporting S-NSSAI.

In step 530, the initial AMF 220 may discover a target AMF capable of supporting S-NSSAI through the process as described with reference to FIG. 4. In other words, the initial AMF 220 may transmit an NS selection request message including information regarding a target AMF required function to be discovered to the NSSF 301. For example, the initial AMF 220 may include, in the NS selection request message, at least one of information for the S-NSSAI associated with the PDN connection established by the UE 200 in the EPC, as received from the SMF+PGW–C 250, the EPC interworking function indicator, the MME identifier (e.g., at least one of MME id, MME group id, MME pool id, or PLMN id) related to the MME 210 having transmitted the forward relocation request message for 4G/5G handover, and the N26 domain indicator for connection with the MME 210. The NSSF 301 may discover the target AMF based on the target AMF required function information received from the initial AMF 220 and the AMF NR profile stored in the NSSF 301. The NSSF 301 may transmit an NS selection response message, which is responsive to the NS selection request message, to the initial AMF 220. The NS selection response message may include AMF information regarding the target AMF discovered by the NSSF 301. Upon receiving the NS selection response message from the NSSF 301, the initial AMF 220 may transmit and receive an NF discovery request/response message to/from the NRF 300 for target AMF selection. The initial AMF 220 may select a target AMF based on the information received from the NSSF 301 and/or the information received from the NRF 300. In other words, the initial AMF 220 may select the target AMF 500 capable of N26 connection with the MME 210 for 4G/5G handover while supporting the S-NSSAI associated with the PDN connection established by the UE 200 in the EPC through the above-described process.

In step 535, the initial AMF 220 may transmit a relocate UE context request message to the selected target AMF 500. The relocate UE context request message may include the forward relocation request message received by the initial AMF 220 from the MME 210 in step 515. The relocate UE context request message may include information for the MME 210 (e.g., MME tunnel endpoint identifier for control plane, MME address for control plane). Upon receiving the relocate context request message from the initial AMF 220, the target AMF 500 may determine whether to perform the 4G/5G handover procedure of the UE 200. If the target AMF 500 may support the 4G/5G handover procedure of the UE 200, the target AMF 500 may determine to serve as the serving AMF of the UE 200. The target AMF 500 may transmit a relocate UE context response message, which is responsive to the relocate UE context request message, to the initial AMF 220 in step 540.

The target AMF 500 selected through step 530 may interpret the EPC NAS message and may generate the EPC NAS message. In other words, the target AMF 500 may interpret the forward relocate request message that is an EPC NAS message included in the relocate UE context request message received from the initial AMF 220 in step 535. The target AMF 500 may generate a forward relocate response message, which is responsive to the forward relocate request message. The forward relocate response message may be an EPC NAS message. The target AMF 500 may transmit the forward relocate response message to the MME 210 in step 545. In this case, the target AMF 500 may transmit the forward relocate response message to the MME 210 in step 545, based on the information for the MME included in the relocate UE context request message received from the initial AMF 220 in step 535. The target AMF 500 may include, in the message of step 545, AMF information related to the target AMF 500 (e.g., target AMF tunnel endpoint identifier for control plane or addresses and TEIDs).

Upon receiving the forward relocate response message from the target AMF 500, the MME 210 may be aware that the AMF for processing the 4G/5G handover of the UE 200 has been changed from the initial AMF 220 to the target AMF 500. The MME 210 may store the target AMF 500 related information received in step 545 and may then set the target AMF 500 as a contact point for performing a 4G/5G handover procedure related to the UE 200.

Figure 6:
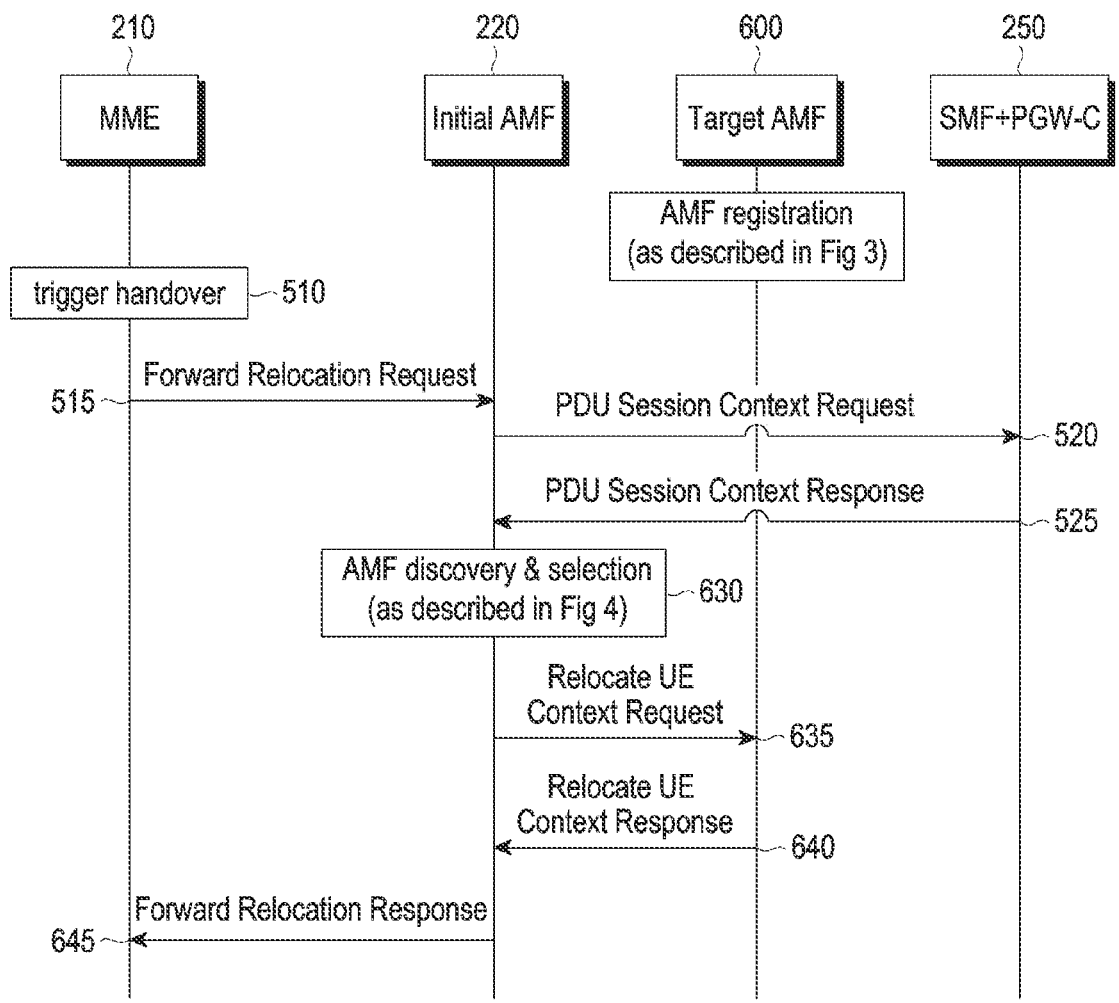
FIG. 6 illustrates a 4G/5G handover method according to an embodiment.

FIG. 6 illustrates an example of a 4G/5G handover process in a wireless communication system according to an embodiment.

A process when the target AMF 600 does not support connection with the MME 210 is described in more detail.

The target AMF 600 may not support the N26 connection with the MME 210. This may include the target AMF 600's failure to interpret/process the EPC NAS message or EPC NAS parameter. When the target AMF 600 does not support the N26 connection with the MME 210, the initial AMF 220 may be positioned between the MME 210 and the target AMF 600 to convert the message. In other words, the initial AMF 220 may convert the EPC NAS message or EPC NAS parameter received from the MME 210 into a 5GC NAS message or 5GC NAS parameter and transmit the message or parameter to the target AMF 600. The initial AMF 220 may convert the 5GC NAS message or 5GC NAS parameter received from the target AMF 600 into an EPC NAS message or EPC NAS parameter and transmit the message or parameter to the MME 210.

Referring to FIG. 6, steps 515 to 525 are identical to those described above with reference to FIG. 5.

In step 525, if the initial AMF 220 may not support the S-NSSAI, the initial AMF 220, which receives the S-NSSAI associated with the PDN connection established by the UE 200 in the EPC from the SMF+PGW-C 250, may determine to perform step 630 to discover a target AMF capable of supporting S-NSSAI.

In step 630, the initial AMF 220 may discover a target AMF capable of supporting S-NSSAI through the process as described with reference to FIG. 4. The initial AMF 220 may transmit an NS selection request message including information regarding a target AMF required function to be discovered to the NSSF 301. For example, the initial AMF 220 may include, in the NS selection request message, at least one of information for the S-NSSAI associated with the PDN connection established by the UE 200 in the EPC, as received from the SMF+PGW-C 250, the EPC interworking function indicator, the MME identifier (e.g., at least one of MME id, MME group id, MME pool id, or PLMN id) related to the MME 210 having transmitted the forward relocation request message for 4G/5G handover, and the N26 domain indicator for connection with the MME 210. The NSSF 301 may discover the target AMF based on the target AMF required function information received from the initial AMF 220 and the AMF NR profile stored in the NSSF 301. If there is no AMF supporting connection with the MME 210 among the AMFs supporting S-NSSAI, the NSSF 301 may determine an AMF, which supports S-NSSAI but does not support connection with the MME 210, as the target AMF. Alternatively, the NSSF 301 may determine, as the target AMF, an AMF which cannot support the S-NSSAI but may support connection with the MME 210. In this case, the AMF to be determined as the target AMF may be determined based on an operator's policy or network slice priority.

The NSSF 301 may reply with an NS selection response message, which is responsive to the NS selection request message, to the initial AMF 220. The NS selection response message may include AMF information regarding the target AMF discovered by the NSSF 301. Upon receiving the NS selection response message from the NSSF 301, the initial AMF 220 may transmit and receive an NF discovery request/response message to/from the NRF 300 for target AMF selection. The initial AMF 220 may select a target AMF based on the information received from the NSSF 301 and/or the information received from the NRF 300. In other words, the initial AMF 220 may select the target AMF 600, which may support the S-NSSAI associated with the PDN connection established by the UE 200 in the EPC but may not support an N26 connection with the MME 210 for 4G/5G handover.

In step 635, the initial AMF 220 may transmit a relocate UE context request message to the selected target AMF 500. The relocate UE context request message may include a message reconfigured from the forward relocation request message received by the initial AMF 220 from the MME 210 in step 515. In other words, since the target AMF 600 cannot interpret and process the EPC NAS message, the initial AMF 220 may convert the forward relocation request message, which is the EPC NAS message received in step 515, into a 5GC NAS message or a 5GC NAS parameter, which may be interpreted by the target AMF 600, and transmit the message or parameter to the target AMF 600. In this case, the relocate UE context request message may not include information for the MME 210 (e.g., MME tunnel endpoint identifier for control plane, MME address for control plane).

Upon receiving the relocate UE context request message from the initial AMF 220, the target AMF 600 may determine whether to perform the UE 200. If the target AMF 600 may support the UE 200, the target AMF 600 may determine to serve as the serving AMF of the LIE 200. The target AMF 600 may reply with a relocate UE context response message, which is responsive to the relocate UE context request message, to the initial AMF 220 in step 640. The target AMF 600 may include a message responsive to the reconfigured message or parameter for the forward relocation request message received in step 635, in the relocate UE context response message in step 640. The response message may be composed of a 5GC NAS message or a 5GC NAS parameter.

Upon receiving the relocate UE context response message from the target AMF 600, the initial AMF 220 may convert the message responsive to the reconfigured message or parameter for the forward relocation request message received from the target AMF 600 into an EPC NAS message or EPC NAS parameter. The initial AMF 220 may transmit the forward relocate response message to the MME 210 in step 645. The forward relocate response message may include the message responsive to the forward relocation request, which has been converted into the EPC NAS message or EPC NAS parameter by the initial AMF 220. In step 645, the forward relocate response message may not include AMF information related to the target AMF 600. Upon receiving the forward relocate response message from the initial AMF 220, the MME 210 may be aware of the result of processing the forward relocation request message requested in step 515, based on the forward relocate response message received in step 645. In other words, the MME 210 may continuously set the AMF 220 as the contact point for performing a 4G/5G handover procedure related to the UE 200.

In step 630, if there is no target AMF that may support the S-NSSAI associated with the PDN connection established by the UE 200 in the EPC and may support the N26 connection with the MME 210 for 4G/5G handover, the initial AMF 220 may not select a target AMF. The initial AMF 220 may determine to reject the handover request received from the MME 210 in step 515. Accordingly, the initial AMF 220 may transmit a message indicating handover failure/rejection to the MME 210 in step 645. Upon receiving the message indicating handover failure/rejection from the initial AMF 220, the MME 210 may be aware that the handover to 5G requested in step 515 has failed/rejected.

Figure 7:
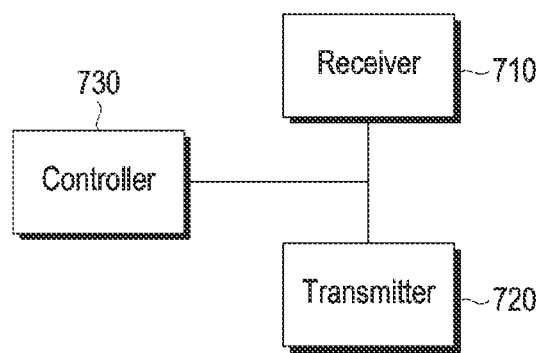
FIG. 7 illustrates an internal structure of an access and mobility function (AMF) according to an embodiment.

FIG. 7 illustrates an internal structure of an AMF according to an embodiment.

Referring to FIG. 7, an AMF 700 includes a receiver 710, a transmitter 720, and a controller 730.

The controller 730 controls the overall operation of the AMF 700, and in particular, controls to perform operations related to EPS interworking. The operation of controlling the AMF by the controller 730 is substantially identical to those described above in connection with FIGS. 3 to 6; thus, no further detailed description thereof is given below.

The receiver 710 receives various messages and information under the control of the controller 730.

The transmitter 720 transmits various messages and information under the control of the controller 730.

Although FIG. 7 illustrates when the receiver 710, the transmitter 720, and the controller 730 are implemented as separate units, at least two of the receiver 710, the transmitter 720, and the controller 730 may be integrated into one component. The receiver 710, the transmitter 720, and the controller 730 may be implemented as at least one processor.

Figure 8:
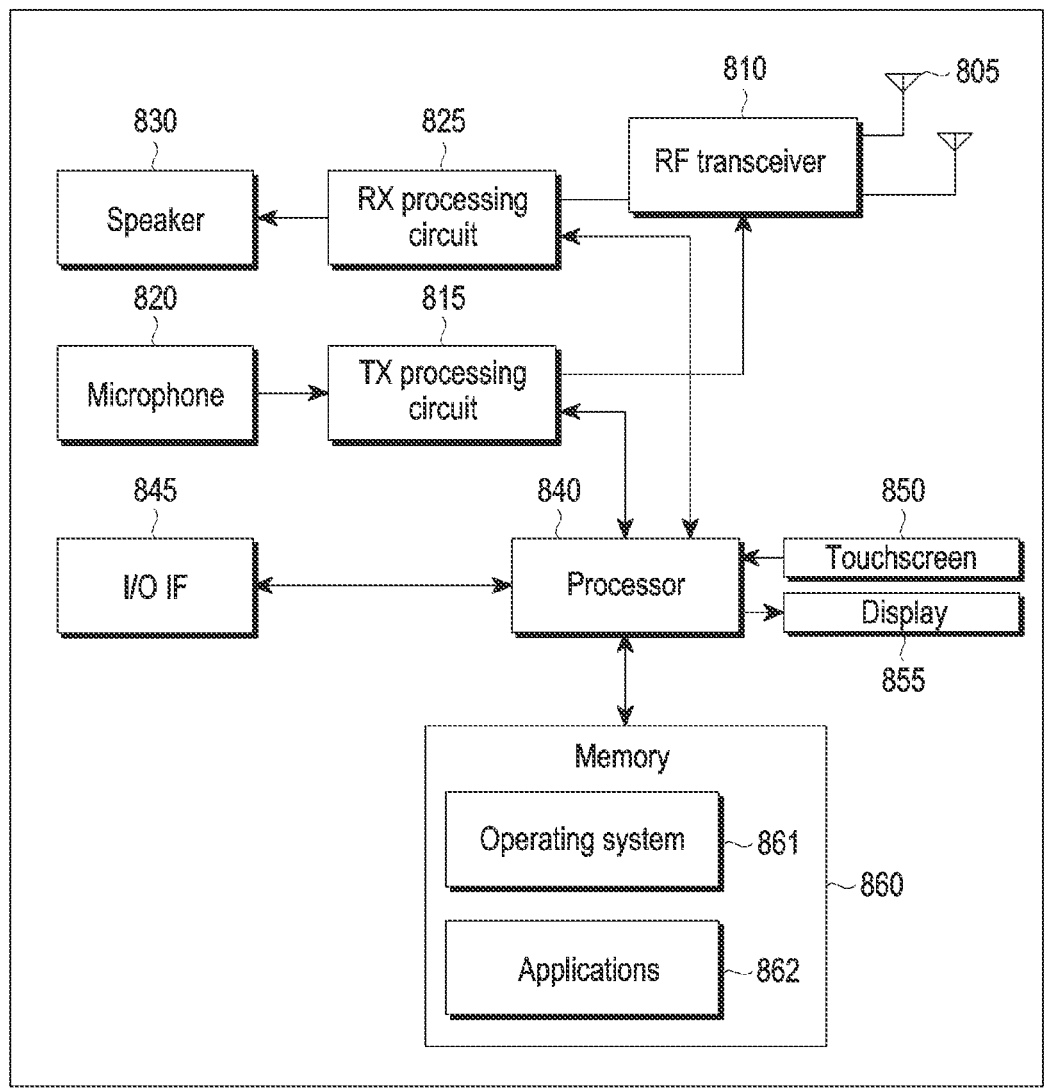
FIG. 8 illustrates an example of an internal structure of a user equipment (UE) in a wireless communication system according to an embodiment.

FIG. 8 illustrates an example of an internal structure of a UE in a wireless communication system according to an embodiment.

As illustrated in FIG. 8, the UE includes an antenna 805, a radio frequency (RF) transceiver 810, a transmit (TX) processing circuit 815, a microphone 820, and a receive (RX) processing circuit 825. The UE further includes a speaker 830, a processor 840, an input/output (I/O) interface (IF) 845, a touch screen 850, a display 855, and a memory 860 including an operating system (OS) 861 and one or more applications 862.

The RE transceiver 810 receives an input RF signal transmitted from a base station in a network, via the antenna 805. The RF transceiver 810 down-converts the input RF signal, generating an intermediate frequency (IF) or baseband signal. The IF or baseband signal is transmitted to the RX processing circuit 825, and the RX processing circuit 825 filters, decodes, and/or digitizes the baseband or IF signal, generating a processed baseband signal. The RX processing circuit 825 sends the processed baseband signal to the speaker 830 for audio data or the processor 840 for web browsing data, for further processing.

The TX processing circuit 815 receives analog or digital audio data from the microphone 820 or other output baseband data (e.g., web data, emails, or interactive video game data) from the processor 840. The TX processing circuit 815 encodes, multiplexes, and/or digitizes the output baseband data, generating a processed baseband or IF signal. The RF transceiver 810 receives the processed baseband or IF signal output from the TX processing circuit 815 and up-converts the baseband or IF signal into an RF signal which is to be transmitted through the antenna 805.

The processor 840 may include one or more processors or other processing devices and may execute the OS 861 stored in the memory 860 to control the overall operation of the UE. As an example, the processor 840 may control reception of downlink channel signals and transmission of uplink channel signals by the RF transceiver 810, the RF processing circuit 825, and the TX processing circuit 815 according to known principles. The processor 840 includes at least one microprocessor or microcontroller.

The processor 840 controls the overall operation related to a scheme for interworking 5GS-EPS interworking or 5GC-EPC interworking) between a 5G network system, which provides a network slice function, and an EPS network system as described above in connection with FIGS. 1 to 6.

The processor 840 may move data into or out of the memory 860 as required by a running process. The processor 840 is configured to execute the applications 862 based on the OS program 861 or in response to signals received from base stations or the operator. The processor 840 is coupled to the I/O interface 845, and the I/O interface 845 provides the UE with to connectability to other devices, e.g., laptop computers and handheld computers. The I/O interface 845 is a communication path between these accessories and the processor 840.

The processor 840 is also connected to the touch screen 850 and the display unit 855. The operator of the UE may input data into the UE using the touch screen 850. The display 855 may be a liquid crystal display, a light emitting diode display, or other displays capable of rendering text and/or at least limited graphics, such as from websites.

The memory 860 is connected to the processor 840. A portion of the memory 860 may include a random access memory (RAM), and the remainder of the memory 860 may include a flash memory or a read-only memory (ROM).

Although FIG. 8 illustrates an example UE, various changes may be made thereto. For example, various components of FIG. 8 may be combined together, each component may be further divided, some components may be omitted, or other components may be added as necessary. As an example, the processor 840 may be divided into multiple processors, such as one or more CPUs and graphics processing units (GPUs). Although the UE is configured in the manner of a mobile phone or a smart phone in FIG. 8, the UE may be configured to operate as a different type of mobile or stationary device.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). It should also be noted that in some replacement execution examples, the functions mentioned in the blocks may occur in different orders. For example, two blocks that are consecutively shown may be performed substantially simultaneously or in a reverse order depending on corresponding functions.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a first entity in a wireless communication system, the method comprising:
   transmitting, by the first entity to a second entity, a registration request message including information related to the first entity;
   receiving, by the first entity from the second entity, a registration response message;
   transmitting, by the first entity to the second entity, a network slice selection request message including information related to inter-system interworking;
   receiving, by the first entity from the second entity, a network slice selection response message including information related to at least one third entity in response to the network slice selection message; and
   selecting, by the first entity, a third entity based on the network slice selection response message,
   wherein the first entity and the third entity are an access and mobility function, and the second entity is a network slicing selection function or a network repository function.

2. The method of claim 1,
   wherein the information related to the inter-system interworking is an indicator indicating that evolved packet system interworking is supported by the first entity.

3. The method of claim 1,
   wherein the network slice selection request message further includes an indicator indicating that connection with a mobility management entity is supported by the first entity.

4. The method of claim 1,
   wherein the at least one third entity includes an access and mobility function supporting evolved packet system interworking.

5. A first entity in a wireless communication system, the first entity comprising:
   a transceiver; and
   a controller configured to control the transceiver to:
   transmit, by the first entity to a second entity, a registration request message including information related to the first entity,
   receive, by the first entity from the second entity, a registration response message,
   transmit, by the first entity to the second entity, a network slice selection request message including information related to inter-system interworking,
   receive, by the first entity from the second entity, a network slice selection response message including information related to at least one third entity in response to the network slice selection request message, and
   select, by the first entity, a third entity based on the network slice selection response message,
   wherein the first entity and the third entity are an access and mobility function, and the second entity is a network slicing selection function or a network repository function.

6. The first entity of claim 5,
   wherein the information related to the inter-system interworking is an indicator indicating that evolved packet system interworking is supported.

7. The first entity of claim 5,
   wherein the network slice selection request message further includes an indicator indicating that connection with a mobility management entity is supported.

8. The first entity of claim 5,
   wherein the at least one third entity includes an access and mobility function supporting evolved packet system interworking.

9. A method performed by a first entity in a wireless communication system, the method comprising:
   receiving, by the first entity from a second entity, a first request message including information related to a third entity;
   transmitting, by the first entity to the third entity, a session context request message based on the first request message;
   receiving, by the first entity from the third entity, a session context response message including information related to a public data network (PDN) connection;
   transmitting, by the first entity to a fourth entity, a registration request message including information related to the first entity;
   receiving, by the first entity from the fourth entity, a registration response message;
   transmitting, by the first entity to the fourth entity, a network slice selection request message including information related to inter-system interworking;
   receiving, by the first entity from the fourth entity, a network slice selection response message including information related to at least one third entity in response to the network slice selection request message; and
   selecting, by the first entity, a fifth entity based on the network slice selection response message,
   wherein the first entity and the fifth entity are an access and mobility function, the second entity is a mobility management entity, and the fourth entity is a network slicing selection function or a network repository function.

10. The method of claim 9,
    wherein the information related to PDN connection comprises information of the PDN connection which is established by a user equipment in an evolved packet system.

11. The method of claim 9,
    wherein selecting the fifth entity based on the session context response message further comprises:
    determining whether a user equipment (UE) supports a single-network slice selection assistance information (S-NNSAI) related to the PDN connection based on the session context response message; and
    selecting the fifth entity in case that the UE supports the S-NNSAI related to the PDN connection.

12. The method of claim 11,
    wherein the information related to the at least one fifth entity includes at least one of information related to the S-NNSAI, an indicator indicating that evolved packet system interworking is supported by the first entity and a second entity identification.

13. The method of claim 12, further comprising:
transmitting, to the at least one fifth entity, a second request message including the first request message; and
receiving, from the at least one fifth entity, a second response message in response to the second request message.

14. The method of claim 13, wherein the second request message includes information related to a mobility management entity.

15. A first entity in a wireless communication system, the first entity comprising:
a transceiver; and
a controller configured to control the transceiver to;
receive, by the first entity from a second entity, a first request message including information related to a third entity,
transmit, by the first entity to the third entity, a session context request message based on the first request message,
receive, by the first entity from the third entity, a session context response message including information related to public data network (PDN) connection,
transmit, by the first entity to a fourth entity, a registration request message including information related to the first entity,
receive, by the first entity from the fourth entity, a registration response message,
transmit, by the first entity to the fourth entity, a network slice selection request message including information related to inter-system interworking,
receive, by the first entity from the fourth entity, a network slice selection response message including information related to at least one fifth entity in response to the network slice selection request message, and
select, by the first entity, a fifth entity based on the network slice selection response message,
wherein the first entity and the fifth entity are an access and mobility function, the second entity is a mobility management entity, and the fourth entity is a network slicing selection function or a network repository function.

16. The first entity of claim 15,
wherein the information related to PDN connection comprises information of the PDN connection which is established by a user equipment in an evolved packet system.

17. The first entity of claim 15,
wherein the controller is further configured to control the transceiver to select the fifth entity by:
determining whether a user equipment (UE) supports a single-network slice selection assistance information (S-NSSAI) related to the PDN connection based on the session context response message; and
selecting the fifth entity in case that the UE supports the S-NNSAI related to the PDN connection.

18. The first entity of claim 17,
wherein the information related to the at least one fifth entity includes at least one of information related to the S-NNSAI, an indicator indicating that evolved packet system interworking is supported and a second entity identification.

* * * * *